United States Patent [19]
Sangster

[11] 3,763,699
[45] Oct. 9, 1973

[54] GAS SUPPORTED FREE RUNNING BELTS FOR TESTING OPERATIONAL CHARACTERISTICS OF ENGINE DRIVEN VEHICLES SUPPORTED ON THE BELTS

[76] Inventor: Arlon G. Sangster, c/o Decitek, a Div. of Jamesbury Corp., 15 Sagamore Rd., Worcester, Mass. 01605

[22] Filed: June 23, 1969

[21] Appl. No.: 835,585

[52] U.S. Cl. ................................. 73/117
[51] Int. Cl. ............................... G01l 3/26
[58] Field of Search .......................... 73/117, 123; 198/129, 184; 226/97

[56] References Cited
UNITED STATES PATENTS

| 756,600 | 4/1904 | Dodge | 198/108 |
| 1,870,716 | 8/1932 | Domzalski | 73/117 |
| 3,020,753 | 2/1962 | Maxwell | 73/117 |

FOREIGN PATENTS OR APPLICATIONS

| 1,166,086 | 3/1964 | Germany | 198/184 |

OTHER PUBLICATIONS

IBM Techn. Disclosure – "Control System", Plattere & Braun, July 2, 1967

"Gas Bearings" – N. Chironis – Product Engineering, Nov. 23, 1959

Primary Examiner—Richard C. Queisser
Assistant Examiner—Arthur E. Korkosz
Attorney—Charles R. Fay

[57] ABSTRACT

A pair of parallel belts upon which the wheels of a vehicle are to be mounted, so that the wheels may turn while the vehicle is held stationary, and plenum chambers arranged under the belt and providing air under pressure impinging upon the belt under each wheel.

5 Claims, 2 Drawing Figures

PATENTED OCT 9 1973　　　　　　　　　　　　　　　　　3,763,699

INVENTOR.
Arlon G. Sangster
BY
Charles R. Jay, atty.

GAS SUPPORTED FREE RUNNING BELTS FOR TESTING OPERATIONAL CHARACTERISTICS OF ENGINE DRIVEN VEHICLES SUPPORTED ON THE BELTS

BACKGROUND OF THE INVENTION

Many testing apparatuses have been provided for the operation of a vehicle while held in stationary position and ordinarily the wheels are mounted on freely rotating rollers or endless flexible belts. This has the disadvantage that the exact operating conditions on the road are not duplicated and if belts are used they wear rapidly. Where rollers are used it is more difficult to approximate road conditions.

SUMMARY OF THE INVENTION

In the present invention the vehicle is driven onto two endless flexible belts each of which is mounted on free rotating pulleys. Each belt is preferably wider than the tires so that various wheel spacings are accommodated. Means is provided to restrain the vehicle in position on the device.

Mounted below the belt at positions consistent with each wheel are four plenum chambers supplied with air under pressure. This air impinges on the under side of the belts in the region of the wheels and supports the belt out of contact with any support so that as the wheels turn, the belt likewise is turned, but not in contact with any support underneath, and the air streams actually support the belts and the entire vehicle. This provides for high speed operation of the vehicle in situ, without wear on the supports but with the tires in the same situation as they would be on a roadway. An advantage is that the non-driven wheels are driven at the same speed as the driving wheels and through the use of this invention conditions of an automobile operating at high speeds on the road are duplicated as far as possible so that problems such as tire balance and vibration can be determined and corrected in a repair shop.

PREFERRED EMBODIMENT OF THE INVENTION

Figure 1:
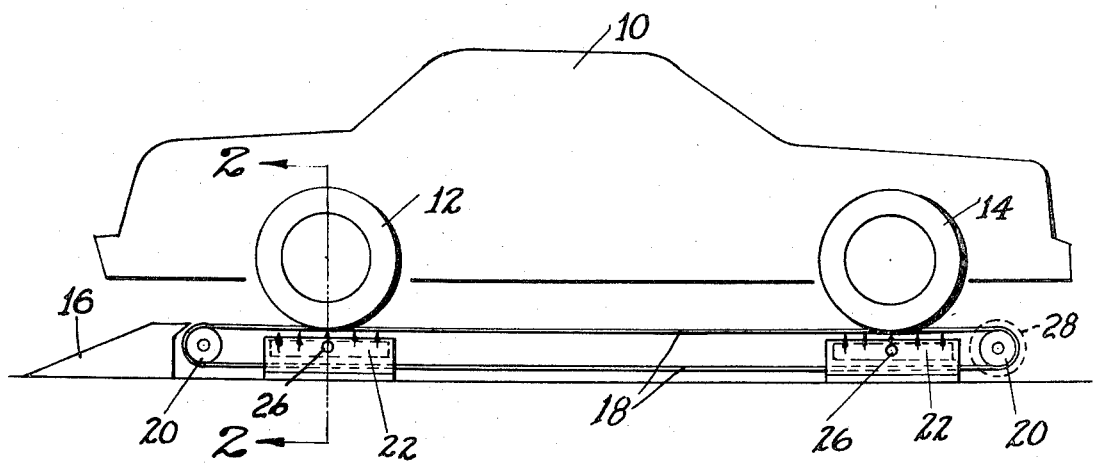
FIG. 1 is a view in side elevation illustrating the invention.

The reference numeral 10 indicates the body of a conventional vehicle of any type which has at least four wheels for instance at 12, 14.

A ramp 16 is provided for driving the vehicle onto a pair of relatively wide belts 18, only one of which appears in FIG. 1, the belts being mounted on freely rotating pulleys or rollers 20, 20 which are supported in any way desired so as to freely rotate as the belts are traveled.

Figure 2:
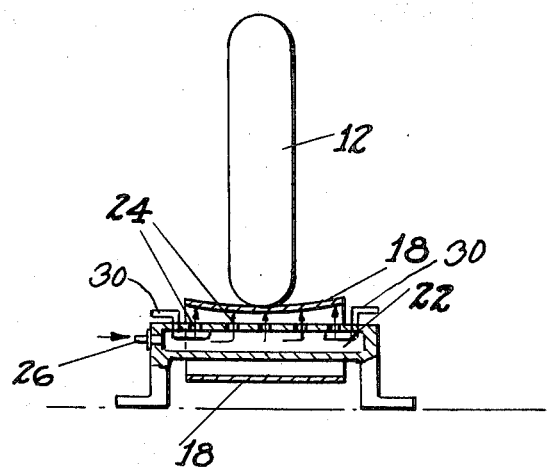
FIG. 2 is an enlarged section on line 2—2 of FIG. 1.

Supported outboard at the sides of the belts are four plenum chambers all of which are alike and are indicated at 22. These are perforated as shown at 24 in FIG. 2 and provided with air under pressure as for instance by a source of supply indicated at 26 as from a pump, or any suitable source.

Air under pressure constantly flows to the four plenum chambers raising the belts as shown in FIG. 1 off the plenum chambers, at the same time raising the entire vehicle which can then be operated in the usual manner. Thus the driving wheels drive the belts which in turn drive the non-driven wheels but without any contact with respect to any underlying support insofar as the belts are concerned.

It has been found that this duplicates as near as possible the conditions of an automobile operating at high speeds on the roadway so that problems of tire balance, vibrations, etc. can be detected and corrected in fixed position.

It is to be understood that the plenum chambers can be adjusted fore and aft in any way and they can be of course mounted in any way consistent with the operation thereof as to the weight of the vehicle. The belts are preferably wide enough to accommodate vehicles of different lateral widths and it will be seen that by relatively simple means a substantial improvement over the conventional manner of supporting the tires on a series of rolls, etc. is provided. The belt can operate at high speeds without wear and support the tires in the same manner as they would be supported on a roadway surface.

A dynamometer 28 can be mounted to be actuated by the belt when the vehicle engine is operated, and this can be used to show brake power and how quickly a stop can be made by actuation of the brakes and release of engine power.

Some or all of the holes in the plenum chambers may provided with valves or other suitable devices as at 30 to block or uncover the same to localize the support of the air regardless of vehicle width or wheelbase length. As shown, the devices 30 are rotary to cover or close any selected hole or holes, as in FIG. 2.

I claim:

1. Apparatus for testing wheeled power-operated vehicles comprising a pair of generally horizontal endless conveyor belts in spaced parallel relation, each belt having a top and a bottom run, means supporting the belts, means providing upward fluid pressure at the under side of the top run of each belt lifting the same in the areas of the upward pressure,
    the means providing the upward pressure being located in the area of said wheels on a vehicle positioned on said belts, the means providing the upward pressure comprising plenum chambers each having an upper perforated surface, a source of supply for air under pressure supplying the plenum chambers,
    and means for selectively opening or closing the perforations in the plenum chamber to provide support under the contact points of the vehicle tires regardless of width and wheel base dimensions thereof.

2. The apparatus of claim 1 wherein the means providing the upward pressure comprises plenum chambers.

3. The apparatus of claim 1 wherein the means providing the upward pressure comprises plenum chambers each having an upper perforated surface, and a source of supply for air under pressure supplying the plenum chambers.

4. The apparatus of claim 3 including means for selectively opening or closing the perforations in the plenum chamber to provide support under the contact point of the vehicle tires regardless of width and wheelbase dimensions thereof.

5. The apparatus of claim 1 including a dynomometer mounted on at least one of the belt supports for rotation by a belt, the dynamometer being loaded by the action of the vehicle engine, and indicating brake action upon demand.

* * * * *